US012776228B2

(12) United States Patent
Sasaki et al.

(10) Patent No.: US 12,776,228 B2
(45) Date of Patent: Oct. 27, 2026

(54) PRINTING MEDIUM AND TAPE CARTRIDGE

(71) Applicant: SEIKO EPSON CORPORATION, Tokyo (JP)

(72) Inventors: Taishi Sasaki, Matsumoto (JP); Tadashi Inaba, Matsumoto (JP); Masaaki Sone, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 18/435,647

(22) Filed: Feb. 7, 2024

(65) Prior Publication Data

US 2024/0265829 A1 Aug. 8, 2024

(30) Foreign Application Priority Data

Feb. 8, 2023 (JP) ................................ 2023-017398

(51) Int. Cl.

| | |
|---|---|
| ***G09F 3/00*** | (2006.01) |
| ***B32B 7/023*** | (2019.01) |
| ***B41J 3/407*** | (2006.01) |
| ***B41J 15/04*** | (2006.01) |
| *G09F 3/02* | (2006.01) |

(52) U.S. Cl.

CPC ............ *G09F 3/0286* (2013.01); *B32B 7/023* (2019.01); *B41J 3/4075* (2013.01); *B41J 15/044* (2013.01); *B32B 2307/412* (2013.01); *B32B 2307/75* (2013.01); *B32B 2519/00* (2013.01); *G09F 2003/0229* (2013.01); *G09F 2003/0257* (2013.01)

(58) Field of Classification Search

CPC ........ B41J 3/4075; B41J 15/044; B41J 32/00; B41J 2/32; B41M 5/382

See application file for complete search history.

(56) References Cited

U.S. PATENT DOCUMENTS

| | | | | |
|---|---|---|---|---|
| 2014/0037359 A1* | 2/2014 | Nakajima | ................ B41J 11/70 | 400/621 |
| 2018/0015749 A1 | 1/2018 | Inoue et al. | | |

FOREIGN PATENT DOCUMENTS

| | | | | |
|---|---|---|---|---|
| CN | 107709023 A | 2/2018 | | |
| JP | H06-127119 A | 5/1994 | | |
| JP | 2006-062210 A | 3/2006 | | |
| JP | 2008-213914 A | 9/2008 | | |
| JP | 2009-233916 A | 10/2009 | | |
| JP | 2017024326 | * 2/2017 | ............ | B41J 3/4075 |
| JP | 2017-141065 A | 8/2017 | | |
| JP | 2017-213701 A | 12/2017 | | |
| WO | WO2016158710 | * 10/2016 | ............ | B41J 15/044 |

* cited by examiner

*Primary Examiner* — Kristal Feggins
(74) *Attorney, Agent, or Firm* — Oliff PLC

(57) ABSTRACT

A printing medium includes: a transparent backing sheet; a plurality of label portions adhered to the backing sheet in a line in a length direction of the backing sheet; a plurality of adhering portions provided in a plurality of inter-label regions between the plurality of label portions and having a lower transparency than the backing sheet; and a plurality of second transparent regions provided in the plurality of inter-label regions in such a way as to be adjacent to the adhering portions in the length direction of the backing sheet, and formed by the backing sheet.

6 Claims, 15 Drawing Sheets

PRINTING MEDIUM AND TAPE CARTRIDGE

The present application is based on, and claims priority from JP Application Serial Number 2023-017398, filed Feb. 8, 2023, the disclosure of which is hereby incorporated by reference herein in its entirety.

BACKGROUND

1. Technical Field

The present disclosure relates to a printing medium and a tape cartridge.

2. Related Art

Hitherto, a label sheet including a backing sheet and a plurality of labels adhered to the backing sheet has been known as disclosed in JP-A-2009-233916. The label sheet is irradiated with light in a thermal printer to detect leading and trailing edges of the label, and a printed image is formed on the label based on the detection result.

When a printing region of a label portion is positioned in a direction toward a tape discharge port, that is, a first feeding direction, with respect to a printing position for a tape printing device at a time point at which a detection point is detected in the tape printing device, a printing medium is fed in a second feeding direction, which is opposite to the first feeding direction, until printing on the printing region starts after the detection point is detected. In a case of a printing medium including a transparent backing sheet, the backing sheet has low rigidity, and the entire printing medium has low rigidity. Therefore, when the printing medium is fed in the second feeding direction until printing on the printing region starts after the detection point is detected, problems such as deformation of the printing medium may occur.

SUMMARY

According to an aspect of the present disclosure, a printing medium includes: a transparent backing sheet; a plurality of label portions adhered to the backing sheet in a line in a length direction of the backing sheet; a plurality of first transparent regions provided in a plurality of inter-label regions between the plurality of label portions and having a lower transparency than the backing sheet; and a plurality of second transparent regions provided in the plurality of inter-label regions in such a way as to be adjacent to the first transparent regions in the length direction of the backing sheet, and formed by the backing sheet.

According to another aspect of the present disclosure, a printing medium includes: a transparent backing sheet; and a plurality of label portions adhered to a first surface of the backing sheet in a line in a length direction of the backing sheet, in which a plurality of printable regions in which a print image is formable are provided in a plurality of inter-label regions between the plurality of label portions on the first surface.

According to an aspect of the present disclosure, a tape cartridge includes: a printing medium; and a cartridge case housing the printing medium, in which the printing medium includes a transparent backing sheet, a plurality of label portions adhered to the backing sheet in a line in a length direction of the backing sheet, a plurality of first transparent regions provided in a plurality of inter-label regions between the plurality of label portions and having a lower transparency than the backing sheet, and a plurality of second transparent regions provided in the plurality of inter-label regions in such a way as to be adjacent to the first transparent regions in the length direction of the backing sheet, and formed by the backing sheet.

According to another aspect of the present disclosure, a tape cartridge includes: a printing medium; and a cartridge case housing the printing medium, in which the printing medium includes a transparent backing sheet and a plurality of label portions adhered to a first surface of the backing sheet in a line in a length direction of the backing sheet, and a plurality of printable regions in which a print image is formable are provided in a plurality of inter-label regions between the plurality of label portions on the first surface.

DESCRIPTION OF EMBODIMENTS

Hereinafter, one embodiment of a printing medium and a tape cartridge will be described with reference to the accompanying drawings. In the following description, directions based on an XYZ orthogonal coordinate system illustrated in each drawing will be used, but these directions are for convenience of description only and do not limit the following embodiments in any way.

Tape Cartridge

Figure 1:
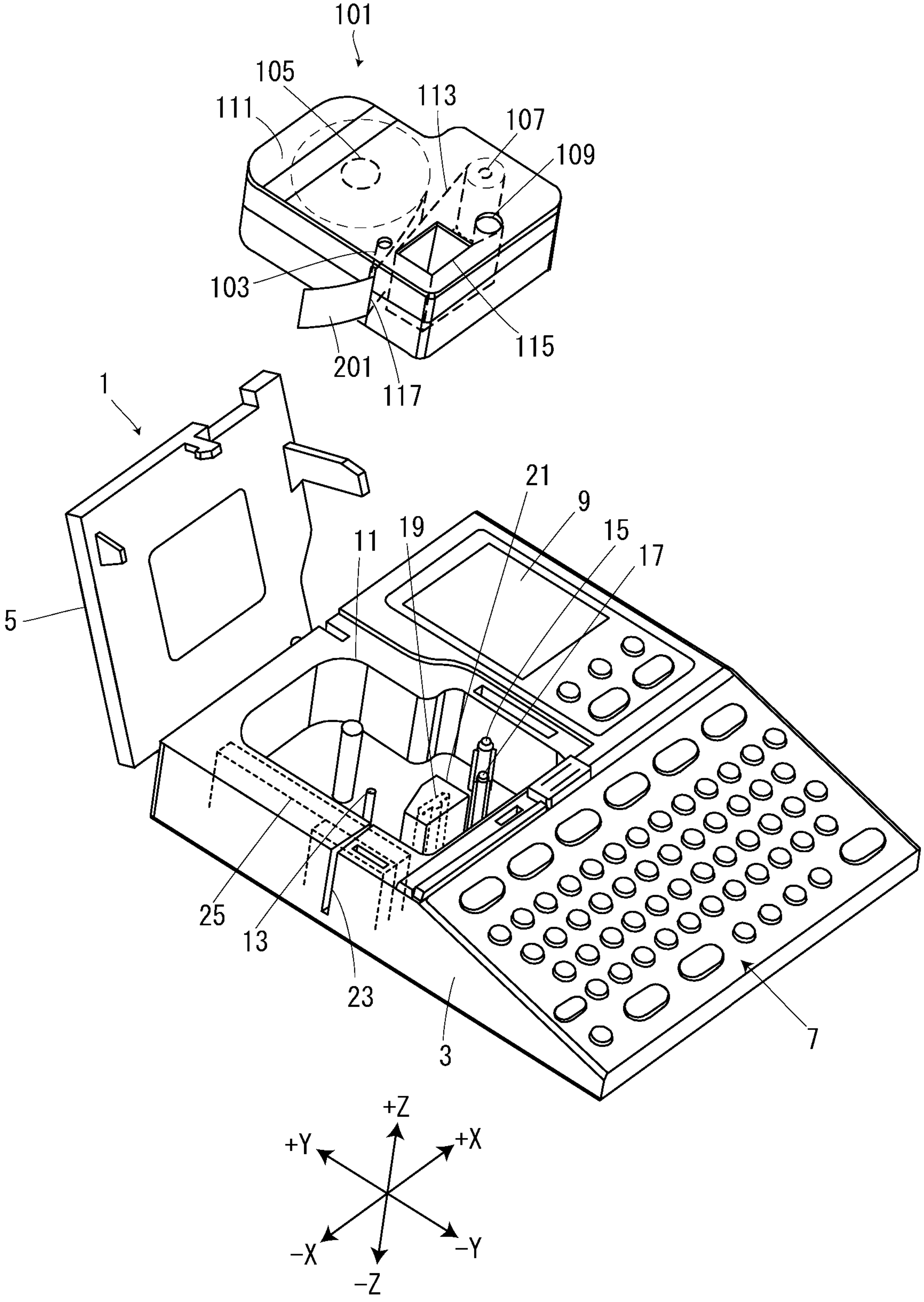
FIG. 1 is a perspective view of a tape cartridge and a tape printing device.

A tape cartridge 101 housing a printing medium 201 will be described with reference to FIG. 1. The tape cartridge 101 includes a platen roller 103, a tape core 105, a feeding core 107, a winding core 109, and a cartridge case 111 that houses the platen roller 103, the tape core 105, the feeding core 107, and the winding core 109.

A tape-shaped printing medium 201 is wound around the tape core 105. An ink ribbon 113 is wound around the feeding core 107. The ink ribbon 113 fed from the feeding core 107 is wound on the winding core 109. A head insertion hole 115 is provided in the cartridge case 111 in such a way as to penetrate through the cartridge case 111 in a Z-axis direction. Furthermore, a tape outlet 117 extending in the Z-axis direction is provided in a-X-direction surface of the cartridge case 111. The printing medium 201 fed from the tape core 105 is fed out of the cartridge case 111 from the tape outlet 117.

Tape Printing Device

A tape printing device 1 on which the tape cartridge 101 is mounted will be described with reference to FIG. 1. The tape printing device 1 includes a device case 3 and a mounting section cover 5. A keyboard 7, a display 9, and a cartridge mounting section 11 are provided on a +Z-direction surface of the device case 3.

The keyboard 7 receives an input operation from a user. The display 9 displays various types of information in addition to an input result from the keyboard 7. The cartridge mounting section 11 is a recess opened in a +Z direction. The tape cartridge 101 is detachably mounted on the cartridge mounting section 11. The mounting section cover 5 is rotatably attached to an +Y-direction end portion of the device case 3 and opens and closes the cartridge mounting section 11.

A platen shaft 13, a feeding shaft 15, and a winding shaft 17 protrude from a bottom surface of the cartridge mounting section 11 in the +Z direction. When the tape cartridge 101 is mounted on the cartridge mounting section 11, the platen shaft 13, the feeding shaft 15, and the winding shaft 17 engage with the platen roller 103, the feeding core 107, and the winding core 109, respectively.

When a motor (not illustrated) included in the tape printing device 1 rotates in a first rotation direction, the platen roller 103 and the winding core 109 rotate in such a way that the printing medium 201 is fed out of the cartridge case 111 from the tape outlet 117, and the ink ribbon 113 is wound on the winding core 109. A direction in which the printing medium 201 is fed at this time, that is, a direction in which the printing medium 201 heads toward a tape discharge port 23, is referred to as a first feeding direction D1 illustrated in FIG. 4. When the motor rotates in a second rotational direction opposite to a first rotational direction, the platen roller 103 and the feeding core 107 rotate in such a way that the printing medium 201 is pulled back into the cartridge case 111 and the ink ribbon 113 is rewound around the feeding core 107. A direction in which the printing medium 201 is fed at this time is referred to as a second feeding direction D2 illustrated in FIG. 4. The second feeding direction D2 is opposite to the first feeding direction D1.

A thermal head 19 and a head cover 21 are provided in the cartridge mounting section 11. The thermal head 19 includes a heating element (not illustrated) and performs printing on the printing medium 201. The head cover 21 partially covers the thermal head 19.

When the tape cartridge 101 is mounted on the cartridge mounting section 11, the thermal head 19 and the head cover 21 are inserted into the head insertion hole 115. Subsequently, when the mounting section cover 5 is closed, the thermal head 19 is moved toward the platen roller 103 by a head moving mechanism (not illustrated). As a result, the printing medium 201 and the ink ribbon 113 are pinched between the thermal head 19 and the platen roller 103. When the platen roller 103 and the winding core 109 rotate in this state, the printing medium 201 and the ink ribbon 113 are fed. At this time, the thermal head 19 generates heat, so that ink on the ink ribbon 113 is transferred to the printing medium 201, and a print image based on the input result from the keyboard 7 is printed on the printing medium 201.

The tape discharge port 23 is provided in a-X-direction surface of the device case 3. The printed printing medium 201 is discharged from the tape discharge port 23. A cutter 25 is provided between the cartridge mounting section 11 and the tape discharge port 23. The cutter 25 cuts the printing medium 201 in a width direction of the printing medium 201. As a result, a printed portion of the printing medium 201 is cut off. Although not illustrated in FIG. 1, a sensor 27 illustrated in FIG. 4 as described below is provided between the thermal head 19 and the cutter 25.

First Embodiment

A printing medium 201A, which is a first embodiment of the printing medium, will be described with reference to FIGS. 2 and 3. The printing medium 201A according to the first embodiment, a printing medium 201B according to a modification of the first embodiment described below, a printing medium 201C according to another modification of the first embodiment, and a printing medium 201D according to a second embodiment are, if not distinguished, collectively referred to as the printing medium 201. The printing medium 201A includes a backing sheet 203 and a plurality of label portions 205 adhered to the backing sheet 203.

The backing sheet 203 is transparent, and a material of the backing sheet 203 is not particularly limited. For example, the backing sheet 203 is made of a resin. The backing sheet 203 is formed in a tape shape. That is, the backing sheet 203 is formed in an elongated and substantially rectangular shape. A length of the backing sheet 203 is, for example, about 8 m. Various widths of backing sheets 203 are available, and the maximum width of the backing sheet 203 is, for example, about 36 mm. In the present embodiment, a length direction of the backing sheet 203 is an X-axis direction, and a width direction of the backing sheet 203 is the Z-axis direction. The length direction of the backing sheet 203 is the same as a length direction of the printing medium 201A, and the width direction of the backing sheet 203 is the same as a width direction of the printing medium 201A.

The plurality of label portions 205 are adhered to the backing sheet 203 in a line in the length direction of the backing sheet 203. In the present embodiment, the plurality of label portions 205 are arranged at approximately equal intervals. However, the plurality of label portions 205 are not limited thereto and may be arranged at irregular intervals.

The label portion 205 is a portion of the printing medium 201A that is subjected to printing by the tape printing device 1. That is, the tape printing device 1 performs printing on the label portion 205 of the printing medium 201A, and does not perform printing on the backing sheet 203 or an adhering portion 213 described below. A region of the label portion 205 on which printing is performed by the tape printing device 1 is referred to as a printing region 207.

The label portion 205 is formed, for example, by die-cutting a base material adhered to the backing sheet 203. After printing, the label portion 205 is peeled off from the backing sheet 203 and adhered to another article. A shape of the label portion 205 is not particularly limited. Examples of the shape of the label portion 205 may include a polygon other than a rectangle, a circle, or an ellipse in addition to the rectangle illustrated in FIG. 2. Further, the label portion 205 may have a tube shape and be made of a heat-shrinkable material. In this case, after printing, the label portion 205 is peeled off from the backing sheet 203, and a cable or the like is inserted into the label portion 205 and heated, so that the label portion 205 is attached to an outer peripheral surface of the cable or the like.

A portion of the printing medium 201A that is positioned between the label portions 205 is cut by the cutter 25. A point to be cut by the cutter 25 is called a planned cut point 209. The planned cut point 209 is positioned in a −X direction with respect to a −X-direction end portion of the adhering portion 213 described below. The −X direction corresponds to a leading edge side of the printing medium 201A.

A region of the backing sheet 203 that is positioned between the plurality of label portions 205 is referred to as an inter-label region 211. The adhering portion 213 is provided in the inter-label region 211. The adhering portion 213 is provided in such a way as to be adjacent to the label portion 205 on a +X-direction side among the two label portions 205 having the inter-label region 211 interposed therebetween, in the −X direction. A cut is formed between the adhering portion 213 and the label portion 205, and each of the adhering portion 213 and the label portion 205 can be peeled off from the backing sheet 203 independently. The adhering portion 213 may be provided apart from the label portion 205 in the −X direction.

The adhering portion 213 and the backing sheet 203 have different transparencies in such a way that an output from the sensor 27 is different between when the adhering portion 213 passes the sensor 27 and when a portion of the backing sheet 203 to which the adhering portion 213 is not adhered passes the sensor 27. That is, the adhering portion 213 functions as a first transparent region having a lower transparency than the backing sheet 203. Furthermore, a region of the backing sheet 203 that is adjacent to the adhering portion 213 in the length direction of the backing sheet 203, that is, in the −X direction, is referred to as a second transparent region 215. A boundary between the adhering portion 213 and the second transparent region 215 becomes a detection point 217 to be detected by the sensor 27.

A shape of the adhering portion 213 is not particularly limited. Examples of the shape of the adhering portion 213 may include a polygon other than a rectangle, a circle, or an ellipse in addition to the rectangle illustrated in FIG. 2. However, the −X-direction end portion of the adhering portion 213 forms the detection point 217, and thus, may extend in the width direction of the backing sheet 203. Therefore, even when the adhering portion 213 is shifted in position in the width direction of the backing sheet 203 with respect to the sensor 27, it is possible to suppress timing misalignment in detection by the sensor 27.

Figure 2:
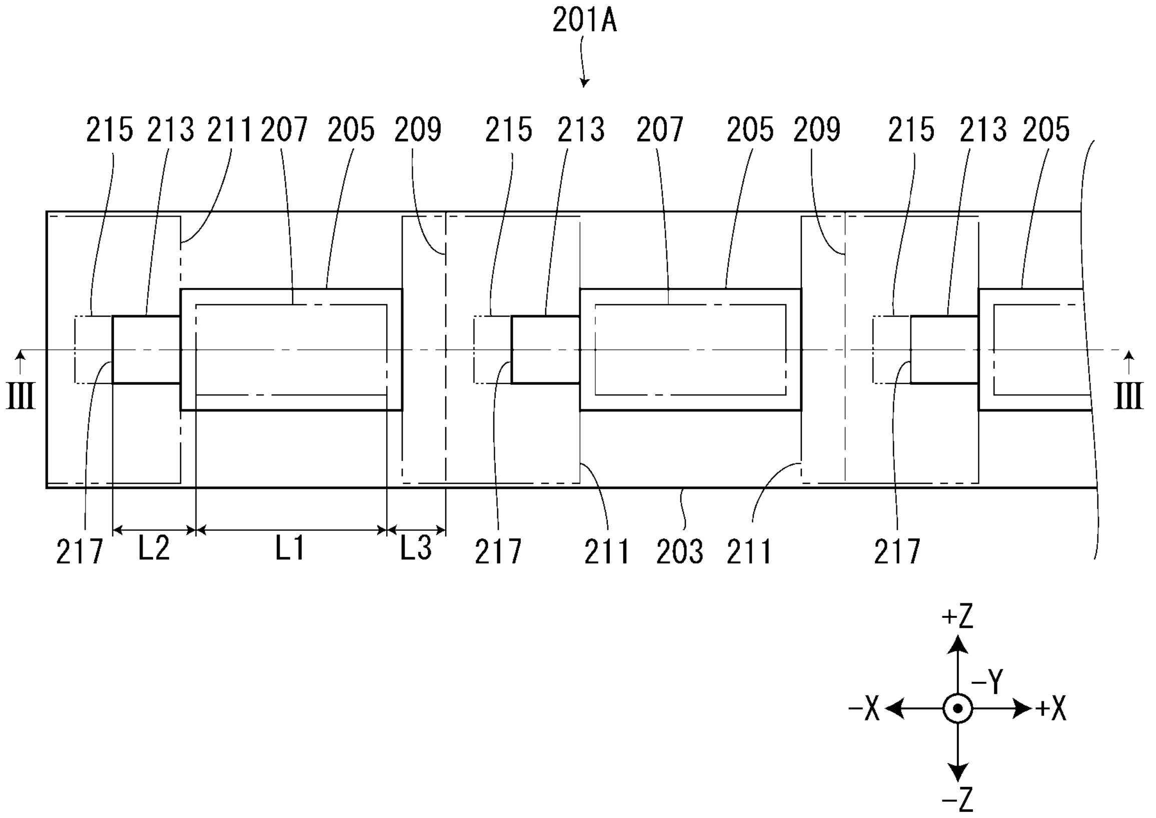
FIG. 2 is a view illustrating a printing medium according to a first embodiment.

In FIG. 2, the adhering portion 213 is adhered to the backing sheet 203 at a middle position in the width direction of the backing sheet 203. However, the adhering portion 213 is not limited thereto and may be provided at any position in the width direction of the backing sheet 203. That is, the inter-label region 211 is a concept that includes both end portions of the backing sheet 203 in the width direction.

Figure 3:
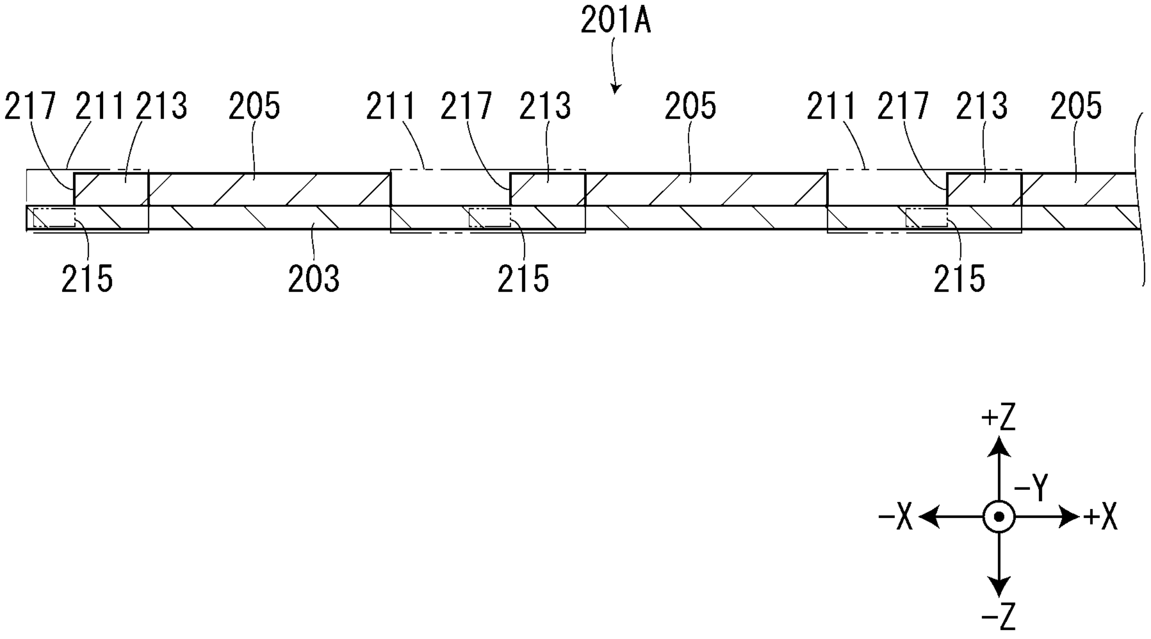
FIG. 3 is a cross-sectional view of the printing medium according to the first embodiment taken along line III-III of FIG. 2.

Further, a surface to which the adhering portion 213 is adhered is not particularly limited, and may be a surface to which the label portion 205 is adhered as illustrated in FIGS. 2 and 3 or may be a surface (not illustrated) opposite to the surface to which the label portion 205 is adhered. However, a configuration in which the adhering portion 213 is adhered to the surface to which the label portion 205 is adhered prevents the printing medium 201A from getting caught on the platen roller 103 or the like and thus is more favorable than a configuration in which the adhering portion 213 is adhered to the surface opposite to the surface to which the label portion 205 is adhered.

The adhering portion 213 may be made of the same material as the label portion 205, or may be made of a different material from the label portion 205. The adhering portion 213 can be made of the same material as the label portion 205, for example, by leaving a portion of the base material adhered to the backing sheet 203 other than the label portion 205, that is, a scrap, at the time of die-cutting.

A dimension of the printing region 207 in the length direction of the backing sheet 203 is referred to as a printing region dimension L1. Further, a dimension between a −X-direction end portion of the printing region 207 and the detection point 217 positioned in the −X direction with respect to the printing region 207 in the length direction of the backing sheet 203 is referred to as a pre-printing dimension L2. Further, a dimension between a +X-direction end portion of the printing region 207 and the planned cut point 209 positioned in a +X direction with respect to the printing region 207 in the length direction of the backing sheet 203 is referred to as a post-printing dimension L3.

The printing region dimension L1, the pre-printing dimension L2, and the post-printing dimension L3 are values determined for each type of tape cartridge 101. Different types of tape cartridges 101 house different types of printing media 201A. The tape printing device 1 stores the printing region dimension L1, the pre-printing dimension L2, and the post-printing dimension L3 for each type of tape cartridge 101. The tape printing device 1 detects the type of the tape cartridge 101 mounted on the cartridge mounting section 11 to acquire the printing region dimension L1, the pre-printing dimension L2, and the post-printing dimension L3 of the printing medium 201A housed in the tape cartridge 101 mounted on the cartridge mounting section 11.

Printing Operation

A printing operation of the tape printing device 1 for the printing medium 201A will be described with reference to FIGS. 4 to 7. The tape printing device 1 includes the sensor 27 provided between the thermal head 19 and the cutter 25. For example, a transmission type optical sensor can be used as the sensor 27. The sensor 27 is provided at a position through which the adhering portion 213 adhered to the backing sheet 203 passes in the width direction of the backing sheet 203. In addition, a distance between a printing position for the thermal head 19 and a detection position for the sensor 27 in a feeding direction of the printing medium 201A is referred to as a head-sensor distance S, and a distance between the printing position for the thermal head 19 and a cutting position for the cutter 25 in the feeding direction of the printing medium 201A is referred to as a head-cutter distance C. The head-sensor distance S and the head-cutter distance C are stored in the tape printing device 1.

Figure 4:
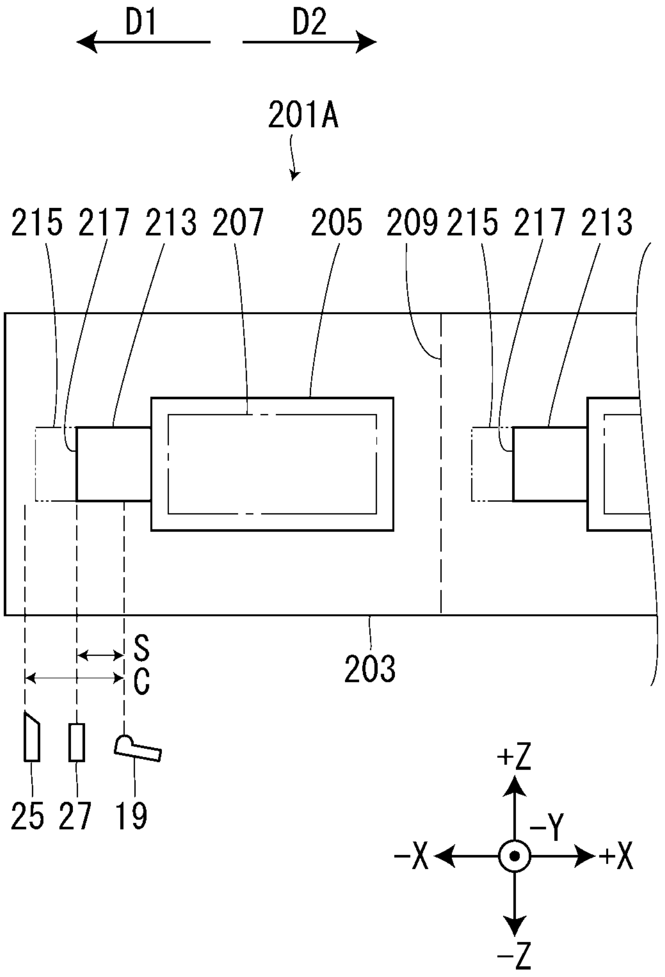
FIG. 4 is a view illustrating a printing operation of the tape printing device for the printing medium.
Figure 7:
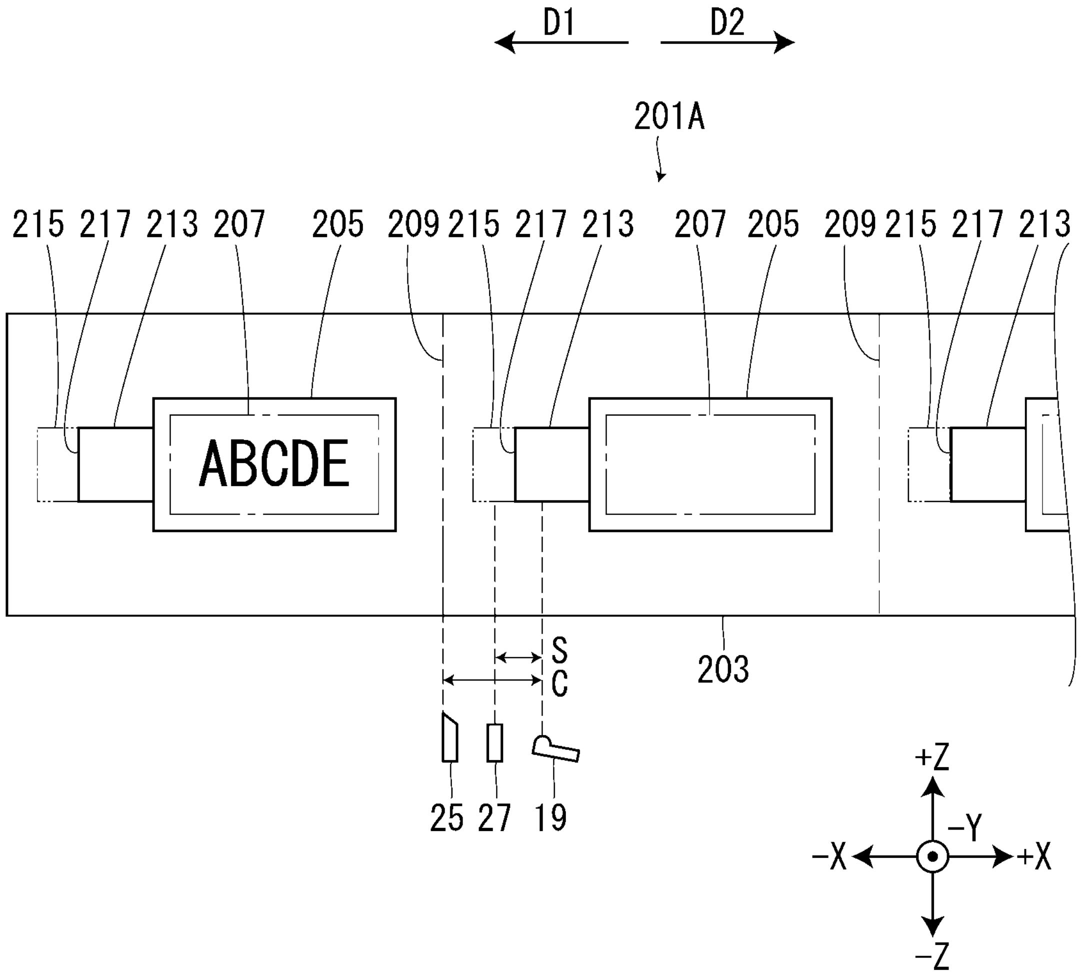
FIG. 7 is a view continuing from FIG. 6 and illustrating the printing operation of the tape printing device for the printing medium.

As illustrated in FIG. 4, when the tape printing device 1 starts the printing operation, the printing medium 201A is fed in the first feeding direction D1, and the sensor 27 detects the detection point 217. That is, the detection point 217 is positioned in the +X direction with respect to the sensor 27 as illustrated in FIG. 7 at a time point at which the printing medium 201A is cut by the cutter 25 and feeding of the printing medium 201A is finished in the previous printing operation. Therefore, when the printing operation starts, the tape printing device 1 feeds the printing medium 201A in the −X direction, that is, the first feeding direction D1, and detects the detection point 217.

Figure 5:
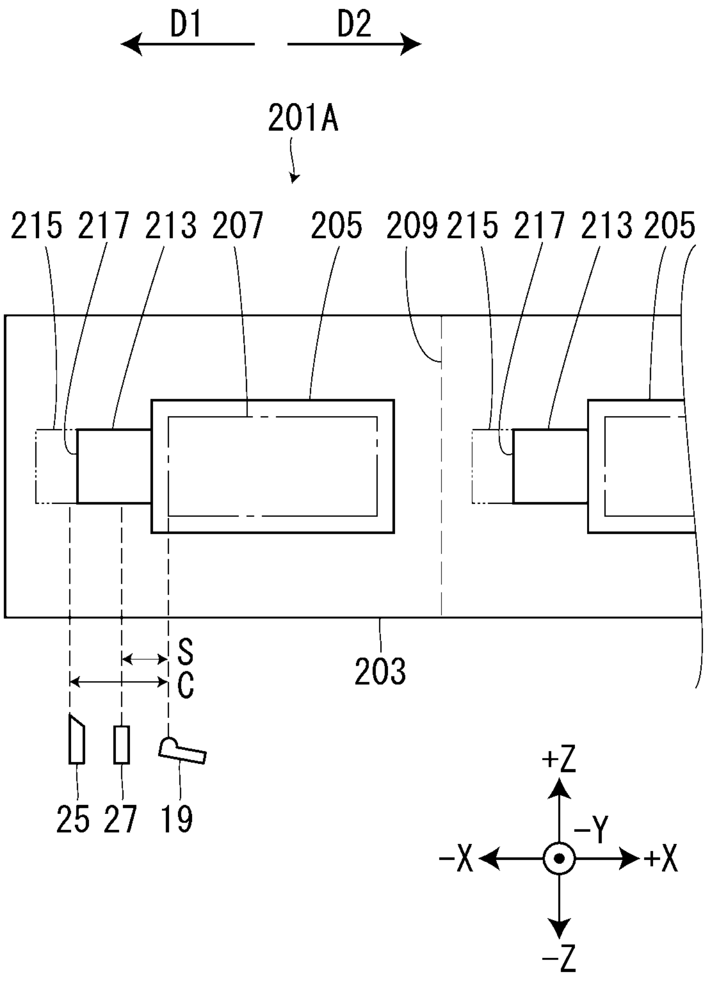
FIG. 5 is a view continuing from FIG. 4 and illustrating the printing operation of the tape printing device for the printing medium.

As illustrated in FIG. 5, after detecting the detection point 217, the tape printing device 1 feeds the printing medium 201A by a first distance in the first feeding direction D1. The first distance corresponds to a difference obtained by subtracting the head-sensor distance S from the pre-printing dimension L2 illustrated in FIG. 2 in the length direction of the backing sheet 203. The tape printing device 1 starts printing on the printing region 207 of the label portion 205 by using the thermal head 19 from a time point at which the printing medium 201A is fed by the first distance.

Figure 6:
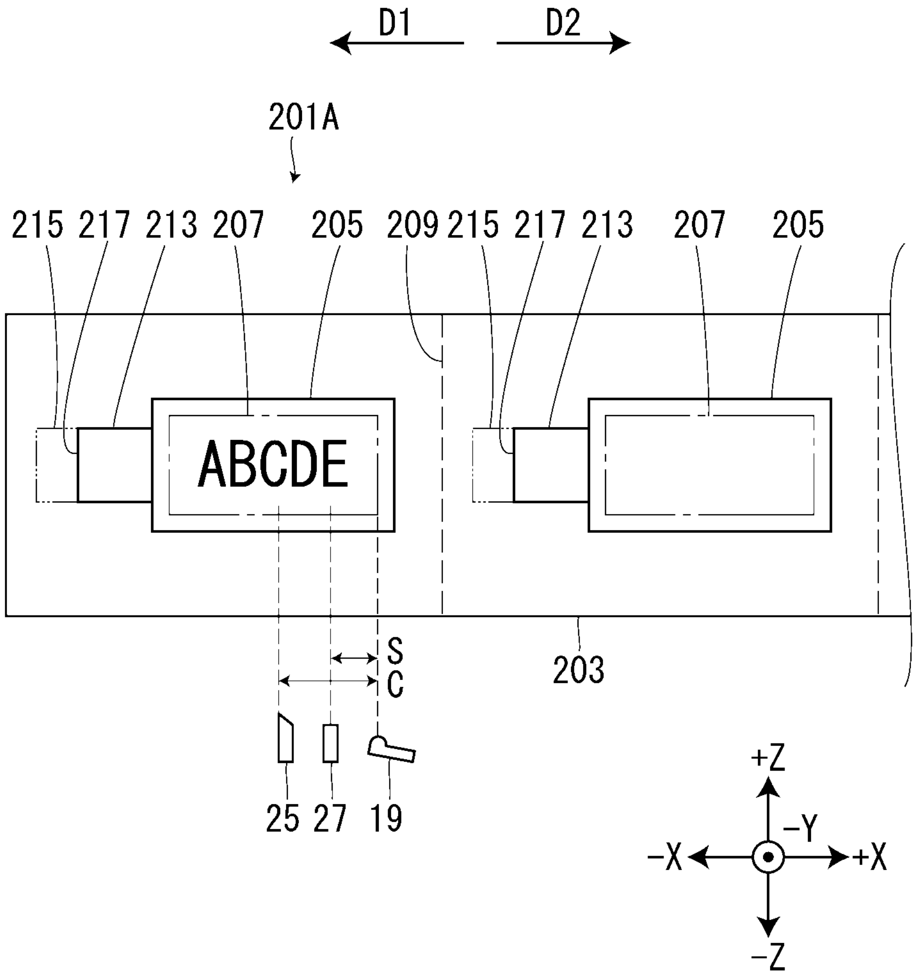
FIG. 6 is a view continuing from FIG. 5 and illustrating the printing operation of the tape printing device for the printing medium.

As illustrated in FIG. 6, the tape printing device 1 feeds the printing medium 201A by the first distance, and then feeds the printing medium 201A by a second distance in the first feeding direction D1. As illustrated in FIG. 2, the second distance corresponds to the printing region dimension L1. The tape printing device 1 end printing on the printing region 207 of the label portion 205 by using the thermal head 19 from a time point at which the printing medium 201A is fed by the second distance.

As illustrated in FIG. 7, the tape printing device 1 feeds the printing medium 201A by the second distance, and then feeds the printing medium 201A by a third distance in the first feeding direction D1. The third distance corresponds to the sum of the post-printing dimension L3 illustrated in FIG. 3 and the head-cutter distance C. The tape printing device 1 cuts the planned cut point 209 of the printing medium 201A by using the cutter 25 at a time point at which the printing medium 201A is fed by the third distance. After the cutter 25 cuts the printing medium 201A, the tape printing device 1 ends the printing operation.

In this way, the thermal head 19 performs printing on the printing region 207 of the label portion 205, and the cutter 25 cuts the printing medium 201A based on the detection of the detection point 217 provided for each label portion 205. Therefore, it is possible to prevent a print image from being printed at a position deviating from the printing region 207 of the label portion 205, and to prevent a point of the printing medium 201A that deviates from the planned cut point 209 from being cut.

Figure 8:
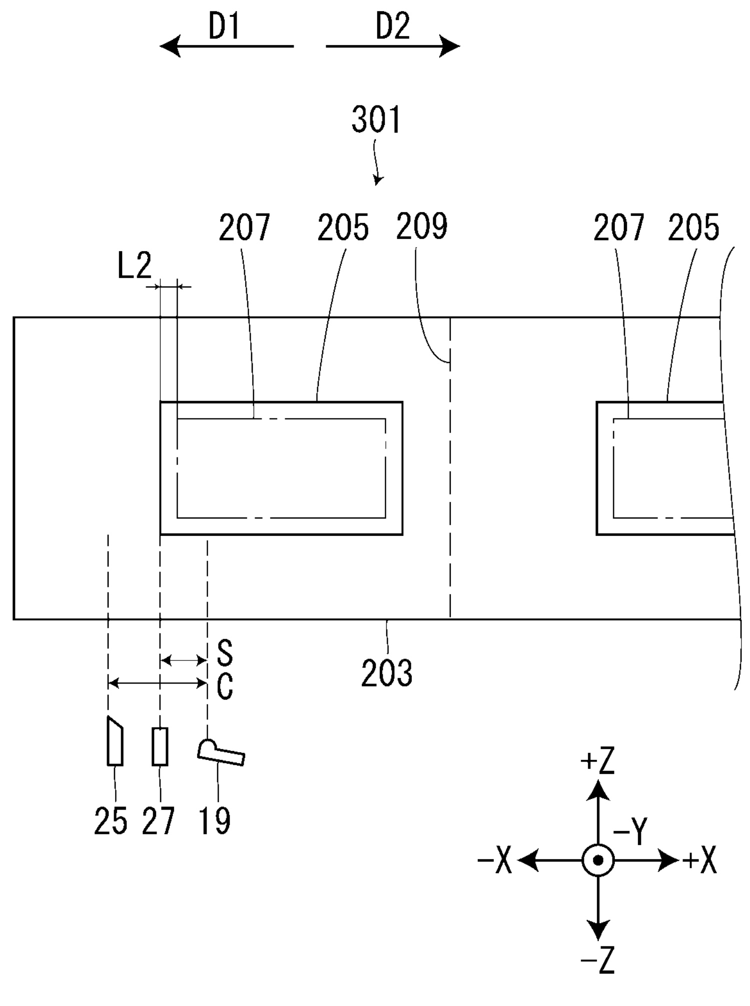
FIG. 8 is a view illustrating a printing operation of the tape printing device for a printing medium according to a comparative example.

Here, a printing medium 301, which is a comparative example of the printing medium 201A, will be described. As illustrated in FIG. 8, the printing medium 301 is not provided with the adhering portion 213. Therefore, the sensor 27 detects a −X-direction end portion of a label portion 205, that is, an end portion of the label portion 205 on a leading edge side of the printing medium 301 in a printing operation for the printing medium 301. In the printing medium 301, a pre-printing dimension L2, which is a dimension between a −X-direction end portion of a printing region 207 and the −X-direction end portion of the label portion 205, is smaller than the pre-printing dimension L2 of the printing medium 201A illustrated in FIG. 2. Therefore, the −X-direction end portion of the printing region 207 is likely to be positioned in the −X direction, that is, the first feeding direction D1, with respect to the printing position for the thermal head 19 as illustrated in FIG. 8 at a time point at which the −X-direction end portion of the label portion 205 is detected by the sensor 27 after the start of printing. In this case, the tape printing device 1 needs to feed the printing medium 201A in the second feeding direction D2 after detecting the −X-direction end portion of the label portion 205 by using the sensor 27 in order to start printing from the −X-direction end portion of the printing region 207.

On the other hand, in the present embodiment, the adhering portion 213 is provided in the inter-label region 211 as described above. Therefore, the −X-direction end portion of the printing region 207 is positioned in the +X direction, that is, the second feeding direction D2, with respect to the printing position for the thermal head 19 as illustrated in FIG. 4 at a time point at which the detection point 217 is detected by the sensor 27 after the start of printing. Therefore, the tape printing device 1 feeds the printing medium 201A in the first feeding direction D1 after detecting the detection point 217 by using the sensor 27, as a result of which printing can start from the −X-direction end portion of the printing region 207 as illustrated in FIG. 5. Accordingly, it is possible to prevent the printing medium 201A from being fed in the second feeding direction D2 until printing on the label portion 205 starts after the detection point 217 is detected by the sensor 27. Therefore, even when the printing medium 201A includes the transparent backing sheet 203 with low rigidity, problems such as deformation of the printing medium 201A when the printing medium 201A is fed in the second feeding direction D2 can be avoided.

As described above, the printing medium 201A according to the first embodiment includes the backing sheet 203, the plurality of label portions 205, the plurality of adhering portions 213, and the plurality of second transparent regions 215. The backing sheet 203 is transparent. The plurality of label portions 205 are adhered to the backing sheet 203 in a line in the length direction of the backing sheet 203. The plurality of adhering portions 213 are provided in the plurality of inter-label regions 211 between the plurality of label portions 205. The plurality of adhering portions 213 have a lower transparency than the backing sheet 203. The plurality of second transparent regions 215 are provided in the plurality of inter-label regions 211 in such a way as to be adjacent to the adhering portions 213 in the length direction of the backing sheet 203, and are regions formed by the backing sheet 203.

With this configuration, the end portion of the printing region 207 on the leading edge side of the printing medium 201A is likely to be positioned in the second feeding direction D2 with respect to the printing position for the thermal head 19 at a time point at which the detection point 217, that is, the boundary between the adhering portion 213 and the second transparent region 215, is detected by the sensor 27 after the start of printing on the printing medium 201A. Accordingly, it is possible to prevent the printing medium 201A from being fed in the second feeding direction D2 until printing on the label portion 205 starts after the detection point 217 is detected by the sensor 27. Therefore, even when the printing medium 201A includes the transparent backing sheet 203 with low rigidity, problems such as deformation of the printing medium 201A when the printing medium 201A is fed in the second feeding direction D2 can be avoided. Furthermore, in a configuration in which the backing sheet 203 has a hole that is to be detected by the sensor 27, there is a possibility that the backing sheet 203 has a lower strength or the hole is caught on the platen roller 103 or the like. On the other hand, with this configuration, the adhering portion 213 is provided on the backing sheet 203 instead of the hole, and it is thus possible to prevent the strength of the backing sheet 203 and transportability of the printing medium 201A from deteriorating.

The pre-printing dimension L2 may be larger than the head-sensor distance S. Accordingly, the end portion of the printing region 207 on the leading edge side of the printing medium 201A can be positioned in the second feeding direction D2 with respect to the printing position for the thermal head 19 at a time point at which the detection point 217 is detected by the sensor 27 after the start of printing on the printing medium 201A.

Modification of First Embodiment

Figure 9:
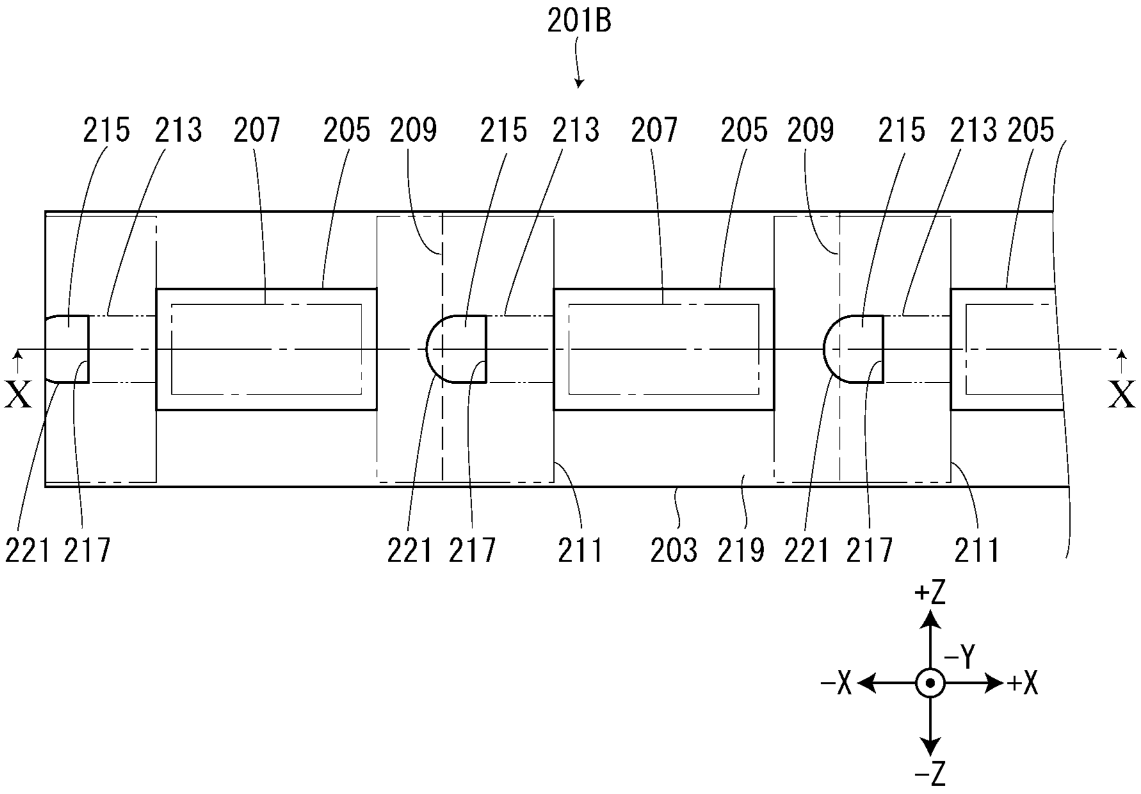
FIG. 9 is a view illustrating a printing medium according to a modification of the first embodiment.
Figure 10:
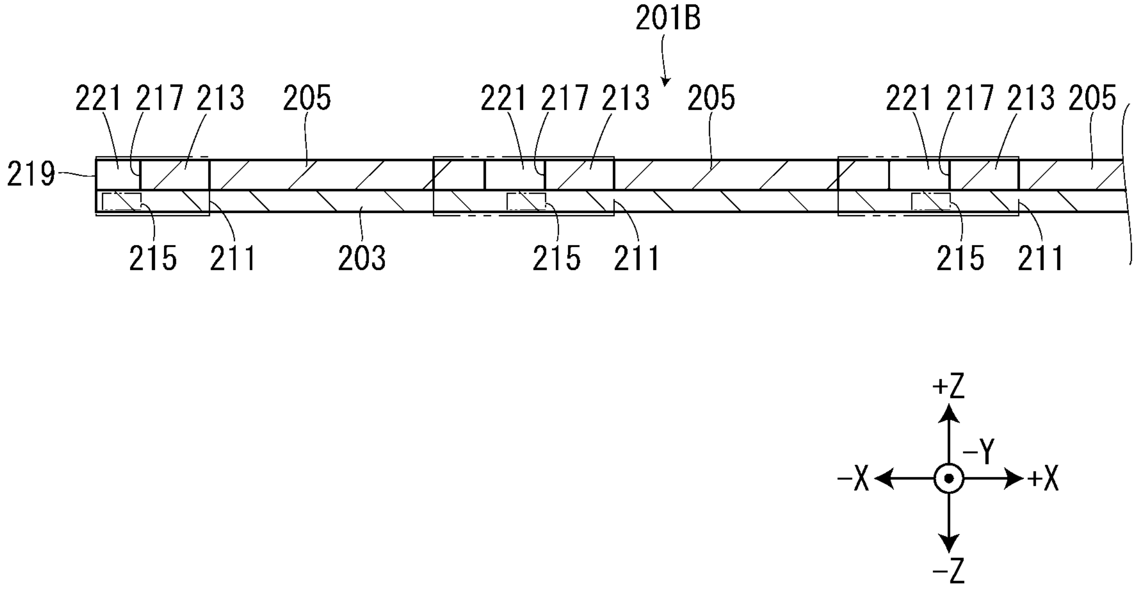
FIG. 10 is a cross-sectional view of the printing medium according to the modification of the first embodiment taken along line X-X of FIG. 9.

The printing medium 201B, which is a modification of the first embodiment, will be described with reference to FIGS. 9 and 10. In the description of the modification of the first embodiment and the second embodiment described below, a description of the points that are configured similarly to the printing medium 201A according to the first embodiment will be omitted.

The printing medium 201B is different from the printing medium 201A in that a label base material 219 is adhered to a backing sheet 203 over the entire surface, and a removal portion 221 from which the label base material 219 is removed is provided in an inter-label region 211.

In the printing medium 201B, a region of the label base material 219 that is adjacent to the removal portion 221 in the +X direction corresponds to an adhering portion 213. Further, in the printing medium 201B, a region of the backing sheet 203 that corresponds to the removal portion 221, that is, a region adjacent to the adhering portion 213 in the −X direction, is referred to as a second transparent region 215. A boundary between the adhering portion 213 and the removal portion 221, that is, a boundary between the adhering portion 213 and the second transparent region 215 becomes a detection point 217 to be detected by the sensor 27.

A shape of the removal portion 221 is not particularly limited. Examples of the shape of the removal portion 221 may include a polygon, a circle, or an ellipse in addition to a semi-ellipse illustrated in FIG. 9. However, a −X-direction end portion of the removal portion 221 forms the detection point 217, and thus, may extend in a width direction of the backing sheet 203. The removal portion 221 is formed at a position that includes a planned cut point 209 in FIG. 9, but is not limited thereto.

Another Modification of First Embodiment

Figure 11:
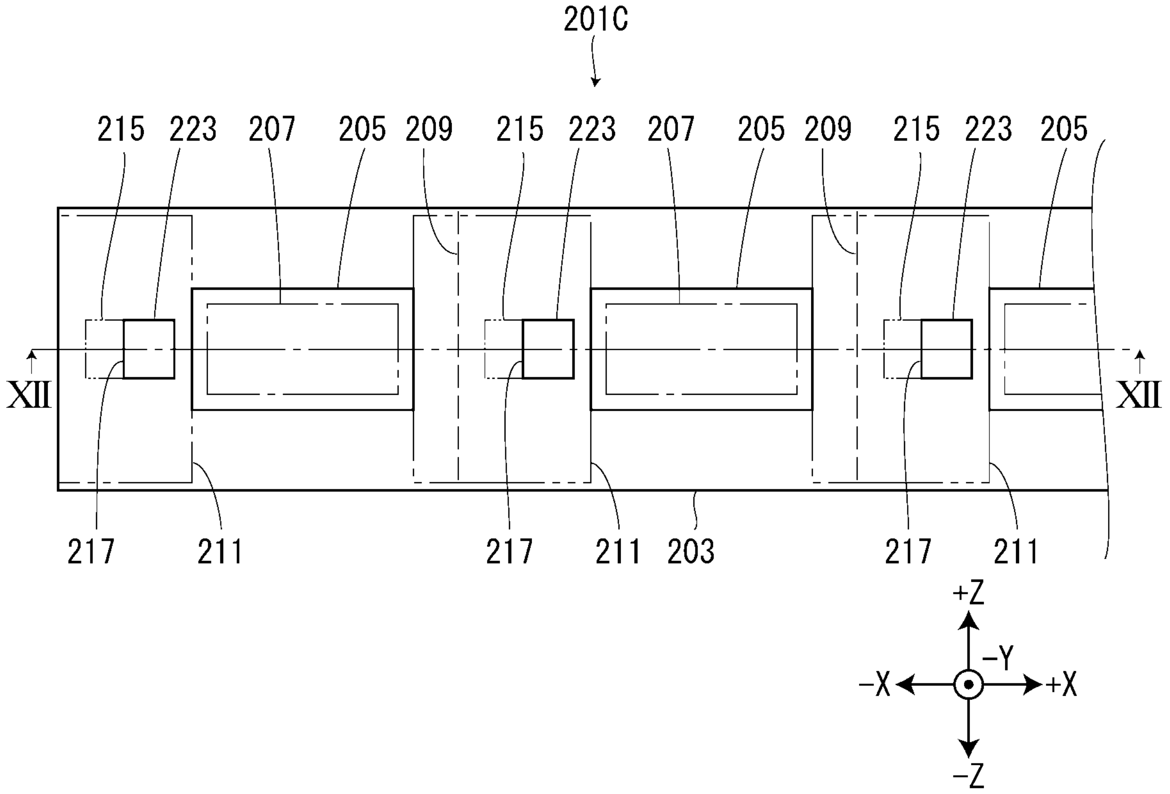
FIG. 11 is a view illustrating a printing medium according to another modification of the first embodiment.
Figure 12:
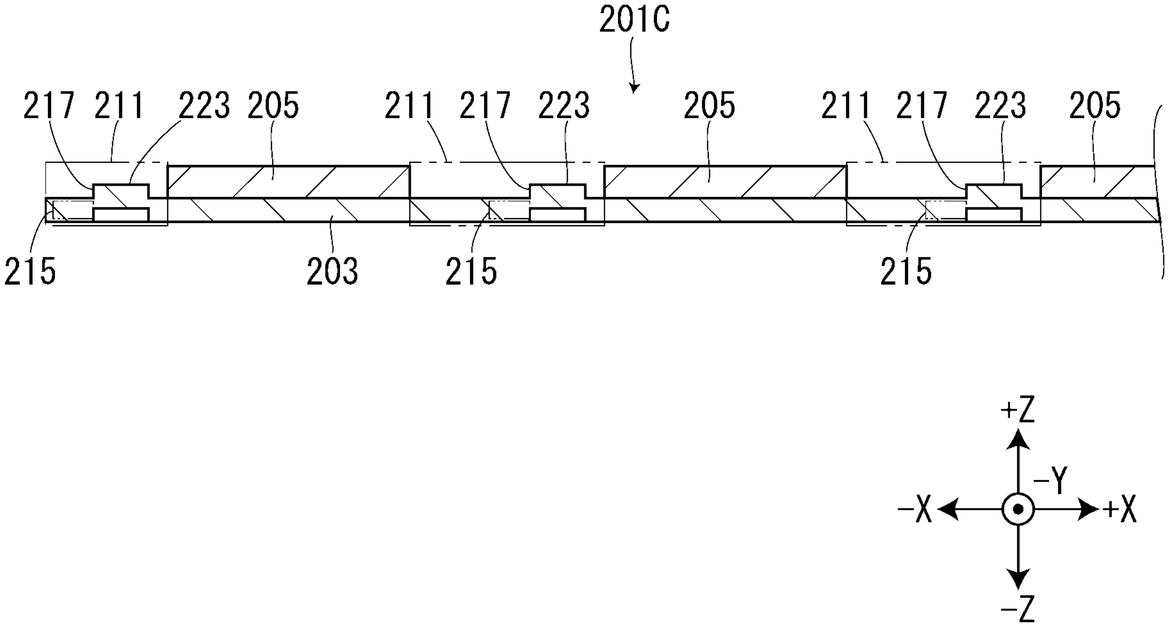
FIG. 12 is a cross-sectional view of the printing medium according to another modification of the first embodiment taken along line XII-XII of FIG. 11.

The printing medium 201C, which is another modification of the first embodiment, will be described with reference to FIGS. 11 and 12. The printing medium 201C is different from the printing medium 201A in that a backing sheet deformed portion 223 is provided in an inter-label region 211 of a backing sheet 203 in place of the adhering portion 213.

The backing sheet deformed portion 223 is a portion of the backing sheet 203 that is deformed in a thickness direction of the backing sheet 203, and thus, has, for example, a white color, and a decreased transparency. That is, the backing sheet deformed portion 223 of the backing sheet 203 has a lower transparency than portions other than the backing sheet deformed portion 223. The backing sheet deformed portion 223 may be a portion deformed in such a way that a surface to which a label portion 205 is adhered projects as illustrated in FIG. 12, or a portion (not illustrated) deformed in such a way that a surface opposite to the surface to which the label portion 205 is adhered projects. However, a configuration in which the backing sheet deformed portion 223 is deformed in such a way that the surface to which the label portion 205 is adhered projects prevents the printing medium 201C from getting caught on the platen roller 103 or the like, and thus, is more favorable than a configuration in which the backing sheet deformed portion 223 is deformed in such a way that the surface opposite to the surface to which the label portion 205 is adhered projects. The backing sheet deformed portion 223 is formed by, for example, press processing using a mold.

In the printing medium 201C, the backing sheet deformed portion 223 functions as the first transparent region. Furthermore, a region of the backing sheet 203 that is adjacent to the backing sheet deformed portion 223 in the −X direction is referred to as a second transparent region 215. A boundary between the backing sheet deformed portion 223 and the second transparent region 215 becomes a detection point 217 to be detected by the sensor 27.

Second Embodiment

Figure 13:
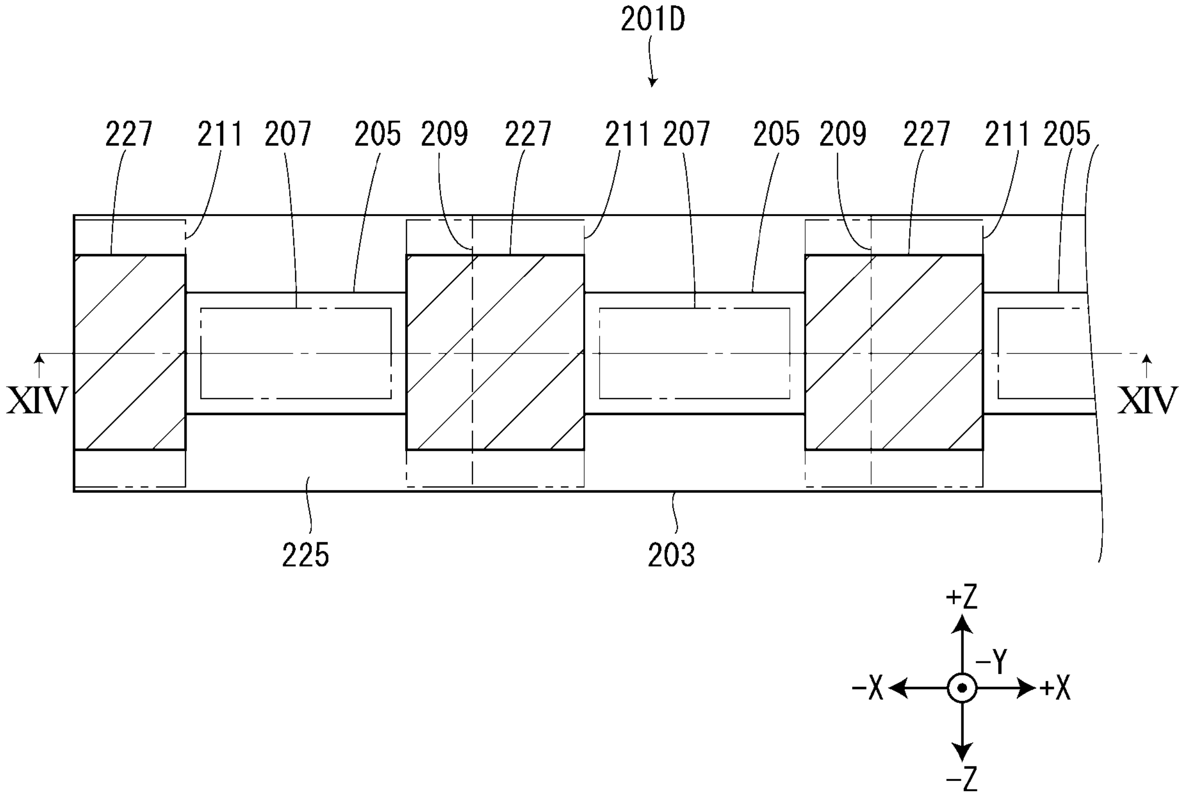
FIG. 13 is a view illustrating a printing medium according to a second embodiment.
Figure 14:
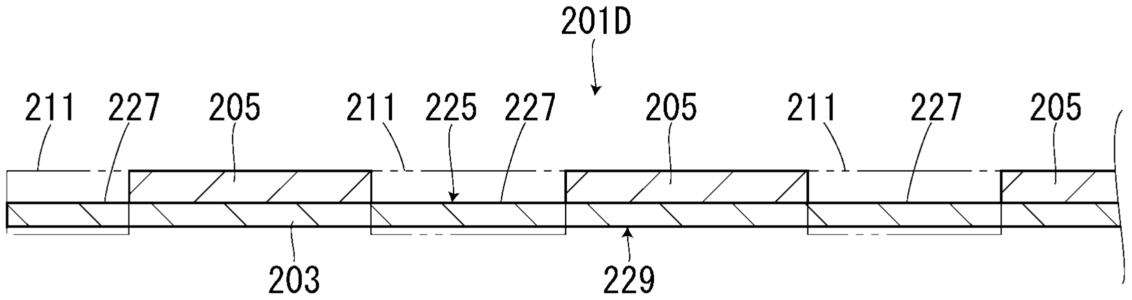
FIG. 14 is a cross-sectional view of the printing medium according to the second embodiment taken along line XIV-XIV of FIG. 13.
Figure 14:
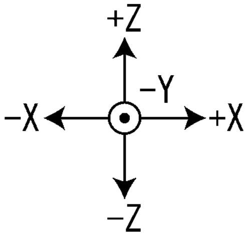

The printing medium 201D, which is the second embodiment of the printing medium, will be described with reference to FIGS. 13 and 14. The printing medium 201D is different from the printing medium 201A in that the adhering portion 213 is not adhered in an inter-label region 211 on a first surface 225 of a backing sheet 203, and a printable region 227 is provided in the inter-label region 211. The first surface 225 refers to a surface to which a plurality of label portions 205 are adhered among front and back surfaces of the backing sheet 203, and a surface opposite to the first surface 225 is referred to as a second surface 229.

The printable region 227 is a region where a print image can be formed by the tape printing device 1. The printable region 227 is formed by, for example, performing a surface treatment on the first surface 225 of the backing sheet 203 in such a way that ink can be easily applied thereto. The printable region 227 may be formed by performing a surface treatment only on a plurality of inter-label regions 211 on the first surface 225, or may be formed by performing a surface treatment also on regions other than the plurality of inter-label regions 211, that is, regions of the backing sheet 203 outside the label portions 205 in a width direction.

Figure 15:
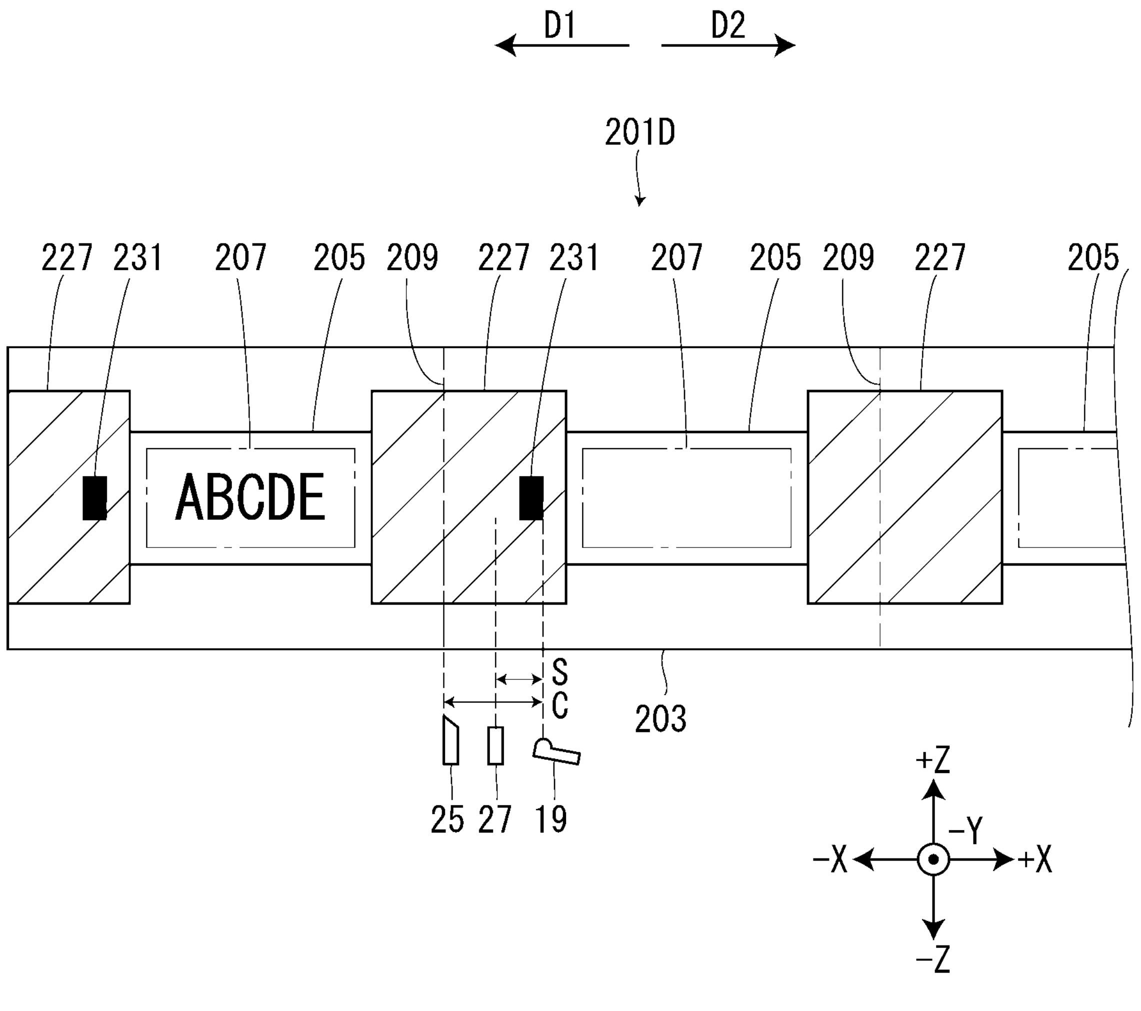
FIG. 15 is a view illustrating a state in which a detection mark is printed on the printing medium according to the second embodiment.

In a printing operation for the printing medium 201D, after printing on a printing region 207 of one label portion 205 is finished, a detection mark 231 is printed by the thermal head 19 in the printable region 227 between the label portion 205 and the next label portion 205 to be printed as illustrated in FIG. 15. The detection mark 231 functions similarly to the adhering portion 213 in the printing medium 201A. That is, the detection mark 231 is detected by the sensor 27 in the printing operation for the label portion 205 positioned in the +X direction with respect to the detection mark 231. In this manner, in the printing operation for the printing medium 201D, printing on the label portion 205 is performed by detecting the detection mark 231 printed in the previous printing operation.

A shape of the detection mark 231 is not particularly limited. However, a −X-direction end portion of the detection mark 231 is detected by the sensor 27, and thus, may extend in the width direction of the backing sheet 203. In FIG. 13, the detection mark 231 is printed on the backing sheet 203 at a middle position in the width direction of the backing sheet 203. However, the detection mark 231 is not limited thereto and may be printed at any position in the width direction of the backing sheet 203.

As described above, the printing medium 201D according to the second embodiment includes the backing sheet 203 and the plurality of label portions 205. The backing sheet 203 is transparent. The plurality of label portions 205 are adhered to the first surface 225 of the backing sheet 203 in a line in a length direction of the backing sheet 203. The plurality of printable regions 227 are provided in the plurality of inter-label regions 211 between the plurality of label portions 205 on the first surface 225.

With this configuration, the detection mark 231 can be printed in the printable region 227 provided in the inter-label region 211 after the start of printing on the printing medium 201D. Accordingly, an end portion of the printing region 207 on a leading edge side of the printing medium 201D is likely to be positioned in the second feeding direction D2 with respect to a printing position for the thermal head 19 at a time point at which the detection mark 231 is detected by the sensor 27. Accordingly, it is possible to prevent the printing medium 201D from being fed in the second feeding direction D2 until printing on the label portion 205 starts after the detection mark 231 is detected by the sensor 27. Therefore, even when the printing medium 201D includes the transparent backing sheet 203 with low rigidity, problems such as deformation of the printing medium 201D when the printing medium 201D is fed in the second feeding direction D2 can be avoided. Furthermore, in a configuration in which the backing sheet 203 has a hole that is to be detected by the sensor 27, there is a possibility that the backing sheet 203 has a lower strength or the hole is caught on the platen roller 103 or the like. On the other hand, with this configuration, the printable region 227 is provided in the backing sheet 203 instead of the hole, and it is thus possible to prevent the strength of the backing sheet 203 and transportability of the printing medium 201D from deteriorating.

Other Modifications

It goes without saying that the present disclosure is not limited to the embodiments described above, and that various configurations can be adopted without departing from the spirit of the present disclosure. In addition, for example, the above-described embodiments can be modified into the following forms. Alternatively, the embodiments and modifications may be combined.

The printing medium 201 is not limited to the form provided as the tape cartridge 101 housed in the cartridge case 111, and may be provided as the printing medium 201 itself.

Supplementary Notes

Hereinafter, the printing medium and the tape cartridge will be supplementarily described. A printing medium includes: a transparent backing sheet; a plurality of label portions adhered to the backing sheet in a line in a length direction of the backing sheet; a plurality of first transparent regions provided in a plurality of inter-label regions between the plurality of label portions and having a lower transparency than the backing sheet; and a plurality of second transparent regions provided in the plurality of inter-label regions in such a way as to be adjacent to the first transparent regions in the length direction of the backing sheet, and formed by the backing sheet.

With this configuration, an end portion of a printing region of the label portion on a leading edge side of the printing medium is likely to be positioned in a second feeding direction with respect to a printing position for a tape printing device at a time point at which a detection point, which is a boundary between an adhering portion and the second transparent region, is detected by a sensor of the tape printing device after the start of printing on the printing medium. Accordingly, it is possible to prevent the printing medium from being fed in the second feeding direction until printing on the label portion starts after the detection point is detected by the sensor. Therefore, even when the printing medium includes the transparent backing sheet with low rigidity, problems such as deformation of the printing medium when the printing medium is fed in the second feeding direction can be avoided. The second feeding direction is a feeding direction of the printing medium in the tape printing device, and refers to a direction opposite to a direction toward a tape discharge port.

In this case, the detection point, which is a boundary between each of the first transparent regions and a corresponding one of the second transparent regions, may extend in a width direction of the backing sheet.

With this configuration, even when the detection point is shifted in position in the width direction of the backing sheet with respect to the sensor of the tape printing device, it is possible to suppress timing misalignment in detection by the sensor.

In this case, a plurality of adhering portions positioned in the plurality of inter-label regions and adhered to the backing sheet may be included as the plurality of first transparent regions.

With this configuration, the first transparent region can be provided on the backing sheet with a simple configuration in which a material having a lower transparency than the backing sheet is adhered to the backing sheet.

In this case, the plurality of adhering portions may be made of a different material from the plurality of label portions.

With this configuration, even when the label portion has, for example, a tube shape and is made of a heat-shrinkable material, the adhering portion can be easily made of paper, polyethylene terephthalate (PET), or the like.

In this case, a plurality of backing sheet deformed portions, which are portions of the backing sheet deformed in a thickness direction of the backing sheet and having a lower transparency than the second transparent regions, may be included as the plurality of first transparent regions.

With this configuration, the first transparent region can be provided in the backing sheet with a simple configuration in which the backing sheet is deformed in the thickness direction of the backing sheet.

A printing medium includes: a transparent backing sheet; and a plurality of label portions adhered to a first surface of the backing sheet in a line in a length direction of the backing sheet, in which a plurality of printable regions in which a print image is formable are provided in a plurality of inter-label regions between the plurality of label portions on the first surface.

With this configuration, a detection mark can be printed in the printable region provided in the inter-label region after the start of printing on the printing medium. Accordingly, an end portion of a printing region of the label portion on a leading edge side of the printing medium is likely to be positioned in a second feeding direction with respect to a printing position for a tape printing device at a time point at which the detection mark is detected by a sensor of the tape printing device. Accordingly, it is possible to prevent the printing medium from being fed in the second feeding direction until printing on the label portion starts after the detection mark is detected by the sensor. Therefore, even when the printing medium includes the transparent backing sheet with low rigidity, problems such as deformation of the printing medium when the printing medium is fed in the second feeding direction can be avoided. The second feeding direction is a feeding direction of the printing medium in the tape printing device, and refers to a direction opposite to a direction toward a tape discharge port.

A tape cartridge includes: a printing medium; and a cartridge case housing the printing medium, in which the printing medium includes a transparent backing sheet, a plurality of label portions adhered to the backing sheet in a line in a length direction of the backing sheet, a plurality of first transparent regions provided in a plurality of inter-label regions between the plurality of label portions and having a lower transparency than the backing sheet, and a plurality of second transparent regions provided in the plurality of inter-label regions in such a way as to be adjacent to the first transparent regions in the length direction of the backing sheet, and formed by the backing sheet.

With this configuration, an end portion of a printing region of the label portion on a leading edge side of the printing medium is likely to be positioned in a second feeding direction with respect to a printing position for a tape printing device at a time point at which a detection point, which is a boundary between an adhering portion and the second transparent region, is detected by a sensor of the tape printing device after the start of printing on the printing medium. Accordingly, it is possible to prevent the printing medium from being fed in the second feeding direction until printing on the label portion starts after the detection point is detected by the sensor. Therefore, even when the printing medium includes the transparent backing sheet with low rigidity, problems such as deformation of the printing medium when the printing medium is fed in the second feeding direction can be avoided. The second feeding direction is a feeding direction of the printing medium in the tape printing device, and refers to a direction opposite to a direction toward a tape discharge port.

A tape cartridge includes: a printing medium; and a cartridge case housing the printing medium, in which the printing medium includes a transparent backing sheet and a plurality of label portions adhered to a first surface of the backing sheet in a line in a length direction of the backing sheet, and a plurality of printable regions in which a print image is formable are provided in a plurality of inter-label regions between the plurality of label portions on the first surface.

With this configuration, a detection mark can be printed in the printable region provided in the inter-label region after the start of printing on the printing medium. Accordingly, an end portion of a printing region of the label portion on a leading edge side of the printing medium is likely to be positioned in a second feeding direction with respect to a printing position for a tape printing device at a time point at which the detection mark is detected by a sensor of the tape printing device. Accordingly, it is possible to prevent the printing medium from being fed in the second feeding direction until printing on the label portion starts after the detection mark is detected by the sensor. Therefore, even when the printing medium includes the transparent backing sheet with low rigidity, problems such as deformation of the printing medium when the printing medium is fed in the second feeding direction can be avoided. The second feeding direction is a feeding direction of the printing medium in the tape printing device, and refers to a direction opposite to a direction toward a tape discharge port.

What is claimed is:

1. A printing medium comprising:

a transparent backing sheet;

a plurality of label portions adhered to the backing sheet in a line in a length direction of the backing sheet;

a plurality of first transparent regions provided in a plurality of inter-label regions between the plurality of label portions, the plurality of first transparent regions being transparent and having a lower transparency than the backing sheet; and a plurality of second transparent regions provided in the plurality of inter-label regions in such a way as to be adjacent to the first transparent regions in the length direction of the backing sheet, and formed by the backing sheet.

2. The printing medium according to claim 1, wherein a detection point, which is a boundary between each of the first transparent regions and a corresponding one of the second transparent regions, extends in a width direction of the backing sheet.

3. The printing medium according to claim 1, wherein a plurality of adhering portions positioned in the plurality of inter-label regions and adhered to the backing sheet are included as the plurality of first transparent regions.

4. The printing medium according to claim 3, wherein the plurality of adhering portions are made of a different material from the plurality of label portions.

5. The printing medium according to claim 1, wherein a plurality of backing sheet deformed portions, which are portions of the backing sheet deformed in a thickness direction of the backing sheet and having a lower transparency than the second transparent regions, are included as the plurality of first transparent regions.

6. A tape cartridge comprising:

a printing medium; and a cartridge case housing the printing medium, wherein the printing medium includes a transparent backing sheet, a plurality of label portions adhered to the backing sheet in a line in a length direction of the backing sheet, a plurality of first transparent regions provided in a plurality of inter-label regions between the plurality of label portions, the plurality of first transparent regions being transparent and having a lower transparency than the backing sheet, and a plurality of second transparent regions provided in the plurality of inter-label regions in such a way as to be adjacent to the first transparent regions in the length direction of the backing sheet, and formed by the backing sheet.

* * * * *